(12) United States Patent
Cao (10) Patent No.: US 11,360,335 B2
(45) Date of Patent: Jun. 14, 2022

(54) OPTICAL WAVEGUIDE APPARATUS, CONTROL METHOD FOR OPTICAL WAVEGUIDE APPARATUS, AND STORAGE MEDIUM

(71) Applicant: HUAWEI TECHNOLOGIES CO., LTD., Guangdong (CN)

(72) Inventor: Shiyi Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 17 days.

(21) Appl. No.: 16/890,444

(22) Filed: Jun. 2, 2020

(65) Prior Publication Data

US 2020/0292912 A1    Sep. 17, 2020

Related U.S. Application Data

(63) Continuation of application No. PCT/CN2017/114472, filed on Dec. 4, 2017.

(51) Int. Cl.
*G02F 1/035* (2006.01)
*G02F 1/313* (2006.01)
*G02F 1/13* (2006.01)

(52) U.S. Cl.
CPC ............ *G02F 1/035* (2013.01); *G02F 1/1326* (2013.01); *G02F 1/313* (2013.01)

(58) Field of Classification Search
CPC ...... G02B 2006/12145; G02B 6/29395; G02B 6/3536; G02F 1/035; G02F 1/1326;
(Continued)

(56) References Cited

U.S. PATENT DOCUMENTS 6,278,425 B1    8/2001 Deluca
6,438,295 B1 *  8/2002 McGarry .............. G02F 1/0126
                                                       385/132
(Continued)

FOREIGN PATENT DOCUMENTS

CN    1438519 A    8/2003
CN    1463378 A    12/2003
(Continued)

OTHER PUBLICATIONS

PCT International Search Report and Written Opinion issued in International Application No. PCT/CN2017/114472 dated Aug. 29, 2018, 16 pages (with English translation).
(Continued)

*Primary Examiner* — Robert Tavlykaev
(74) *Attorney, Agent, or Firm* — Fish & Richardson P.C.

(57) ABSTRACT

An optical waveguide apparatus, a control method for the optical waveguide apparatus, and a storage medium are described in the disclosure. In one example implementation, an optical waveguide apparatus includes a control component and a waveguide structure. The waveguide structure includes m input interfaces and n output interfaces, where both m and n are integers greater than 1. The waveguide structure includes a first waveguide layer and a second waveguide layer, where an optical waveguide exists in the second waveguide layer. The control component is configured to control the first waveguide layer to form an optical waveguide, and the optical waveguide and an optical waveguide in the second waveguide layer form a cross-layer optical signal path.

8 Claims, 7 Drawing Sheets

(58) Field of Classification Search
CPC ...... G02F 1/313; G02F 1/3132; G02F 1/3135; G02F 1/3137
USPC .......................................... 385/9, 14, 16, 17
See application file for complete search history.

(56) References Cited

U.S. PATENT DOCUMENTS

| | | | |
|---|---|---|---|
| 6,785,439 B2 * | 8/2004 | Hoke | G02B 6/3596 385/147 |
| 2003/0156793 A1 | 8/2003 | Kawamoto et al. | |
| 2004/0202398 A1 | 10/2004 | Boissier et al. | |
| 2013/0034323 A1 * | 2/2013 | Costache | G02F 1/313 385/8 |
| 2016/0004010 A1 * | 1/2016 | Miller | G02B 6/138 385/131 |
| 2016/0327751 A1 * | 11/2016 | Wu | G02B 6/3584 |
| 2016/0357037 A1 | 12/2016 | Blasl et al. | |

FOREIGN PATENT DOCUMENTS

| | | |
|---|---|---|
| CN | 102944912 A | 2/2013 |
| CN | 203101726 U | 7/2013 |
| CN | 103703405 A | 4/2014 |
| CN | 103777273 A | 5/2014 |
| CN | 104516112 A | 4/2015 |
| CN | 105223646 A | 1/2016 |
| CN | 105489987 A | 4/2016 |
| CN | 106170732 A | 11/2016 |
| EP | 1126303 A1 | 8/2001 |
| EP | 2513715 B1 | 3/2014 |
| KR | 20160079946 A | 7/2016 |

OTHER PUBLICATIONS

Office Action issued in Chinese Application No. 201780097177.X dated Nov. 24, 2020, 6 pages.

* cited by examiner

OPTICAL WAVEGUIDE APPARATUS, CONTROL METHOD FOR OPTICAL WAVEGUIDE APPARATUS, AND STORAGE MEDIUM

CROSS-REFERENCE TO RELATED APPLICATIONS

This application is a continuation of International Application No. PCT/CN2017/114472, filed on Dec. 4, 2017, the disclosure of which is hereby incorporated by reference in its entirety.

TECHNICAL FIELD

This application relates to the field of optical networks, and in particular, to an optical waveguide apparatus, a control method for the optical waveguide apparatus, and a storage medium.

BACKGROUND

An optical waveguide apparatus is an apparatus that can directly transmit or process an optical signal without optical-to-electrical conversion. An optical waveguide apparatus for optical signal switching usually includes a plurality of input interfaces, a plurality of output interfaces, and a plurality of optical waveguides. The plurality of optical waveguides can guide an optical signal input by any one of the plurality of input interfaces to any one of the plurality of output interfaces.

There is an optical waveguide apparatus in a related technology. The optical waveguide apparatus includes a control component, m input interfaces, n output interfaces, and a waveguide layer. The waveguide layer can form, under control of the control component, an optical waveguide connecting one input/output interface pair (one input/output interface pair includes one input interface and one output interface), and the optical waveguide can transmit an optical signal between the pair of input and output interfaces.

In a process of implementing this application, the inventor finds that the related technology has at least the following problems: If a relatively large quantity of optical waveguides are formed in the waveguide layer, a plurality of optical waveguides may have a large quantity of co-layer intersections, and the co-layer intersections cause a specific loss, further increasing an overall loss of the optical waveguide apparatus.

SUMMARY

This application provides an optical waveguide apparatus, a control method for the optical waveguide apparatus, and a storage medium, to resolve a problem of a relatively large loss caused by waveguide intersections in an optical waveguide apparatus in a related technology. The technical solutions are as follows.

According to a first aspect of this application, an optical waveguide apparatus is provided, where the optical waveguide apparatus includes a control component and a waveguide structure. The waveguide structure includes m input interfaces and n output interfaces, where both m and n are integers greater than or equal to 1. The waveguide structure includes a first waveguide layer configured to form or eliminate an optical waveguide under control of the control component. The waveguide structure further includes a second waveguide layer, where an optical waveguide exists in the second waveguide layer. The control component is configured to control the first waveguide layer based on control information (the control information is used to instruct to connect at least x input/output interface pairs), to form, in the waveguide structure, optical signal paths connecting the at least x input/output interface pairs.

An optical signal path connecting each of the at least x input/output interface pairs may include at least one optical waveguide in the first waveguide layer or the second waveguide layer, and each of the at least x input/output interface pairs includes one of the m input interfaces and one of the n output interfaces, where x is an integer greater or equal to 1.

In the technical solutions of this application, the control component controls the first waveguide layer to form an optical waveguide, and the optical waveguide and an optical waveguide in the second waveguide layer form a cross-layer optical signal path. In this way, another optical waveguide in the first waveguide layer can pass through the optical signal path by using a cross-layer position in the optical signal path, so that intersections of optical waveguides in a same waveguide layer are reduced, and a loss caused by co-layer intersections is reduced, further reducing an overall loss of the optical waveguide apparatus.

A loss caused by a structure is used to reflect a loss caused by the structure to an optical signal. For example, a loss caused by a waveguide bifurcation may be a ratio of a strength of an optical signal when being output from the waveguide bifurcation to a strength of the optical signal before entering the waveguide bifurcation.

Optionally, the control component is configured to adjust a refractive index of a preset area in the first waveguide layer based on the control information, to form or eliminate an optical waveguide in the first waveguide layer. For example, the control component may make the refractive index of the preset area in the first waveguide layer greater than a refractive index of an area outside the preset area, to form an optical waveguide in the preset area, or the control component may make the refractive index of the preset area that is in the first waveguide layer and that includes two strip areas less than a refractive index of another area, to form an optical waveguide between the two strip areas.

In the technical solutions of this application, an optical waveguide is formed in the first waveguide layer when needed, thereby avoiding a loss caused by an optical waveguide bifurcation.

Optionally, optical waveguides included in the optical signal paths connecting the at least x input/output interface pairs in the first waveguide layer do not intersect; and/or optical waveguides included in the optical signal paths connecting the at least x input/output interface pairs in the second waveguide layer do not intersect.

In the technical solutions of this application, a loss caused by an optical waveguide intersection is avoided by eliminating the waveguide bifurcation and/or making optical waveguides in a waveguide layer not intersect.

Optionally, the second waveguide layer is a fixed waveguide layer, and a fixed optical waveguide is disposed in the fixed waveguide layer. The fixed optical waveguide may be an optical waveguide formed by using a conventional technique.

In the technical solutions of this application, a plurality of fixed optical waveguides are disposed in the second waveguide layer, and these fixed optical waveguides and optical waveguides formed in the first waveguide layer in real time can jointly form the optical signal paths connecting the at least x input/output interface pairs.

Optionally, each optical waveguide included in the optical signal paths connecting the at least x input/output interface pairs in the second waveguide layer corresponds to one input/output interface pair (different optical waveguides in the second waveguide layer correspond to different input/output interface pairs), and any optical waveguide included in the optical signal paths connecting the at least x input/output interface pairs in the second waveguide layer and an optical waveguide in the first waveguide layer are configured to form an optical signal path connecting an input/output interface pair corresponding to the any optical waveguide.

In the technical solutions of this application, each optical waveguide in the second waveguide layer is an optical waveguide dedicated for one input/output interface pair, and optical waveguides included in optical signal paths between different input/output interface pairs in the second waveguide layer are different. In such a setting, when a connection relationship between some interfaces is changed, optical signal paths between other interfaces are not affected.

Optionally, the second waveguide layer is configured to form or eliminate an optical waveguide under control of the control component.

In the technical solutions of this application, the second waveguide layer may alternatively be a waveguide layer that can form or eliminate an optical waveguide under control of the control component.

Optionally, the control component is configured to adjust a refractive index of a preset area in the second waveguide layer based on the control information, to form or eliminate an optical waveguide in the second waveguide layer.

Optionally, a cross-layer optical signal path that includes at least one optical waveguide in the first waveguide layer and at least one optical waveguide in the second waveguide layer exists in the optical signal paths connecting the at least x input/output interface pairs. An optical signal can enter the second waveguide layer from the first waveguide layer or enter the first waveguide layer from the second waveguide layer through a coupling position between two adjacent optical waveguides in different waveguide layers in the cross-layer optical signal path. A minimum distance between the two optical waveguides at the coupling position is less than an intersecting waveguide distance, where the intersecting waveguide distance is a minimum distance between either of the two optical waveguides and an intersecting optical waveguide, and the intersecting optical waveguide is an optical waveguide that is in a different waveguide layer and that intersects with the either optical waveguide.

In the technical solutions of this application, a loss caused by a cross-layer intersection of optical waveguides can be reduced by increasing a distance between optical waveguides that intersect across layers.

Optionally, the first waveguide layer and the second waveguide layer are attached to each other, and a bump facing the first waveguide layer is disposed on the second waveguide: layer at an intersection of the either optical waveguide and the intersecting optical waveguide.

In the technical solutions of this application, the distance between the optical waveguides that intersect across layer may be increased by disposing a bump.

Optionally, the first waveguide layer and the second waveguide layer are attached to each other, and a dent having an opening facing the first waveguide layer is disposed in the second waveguide layer at the coupling position, and a part, at the coupling position, of an optical waveguide in the first waveguide layer in any two optical waveguides is located in the dent.

In the technical solutions of this application, a distance between an optical waveguide in the first waveguide layer and an optical waveguide in the second waveguide layer at the coupling position may be reduced by disposing a dent, to reduce a loss caused by coupling.

Optionally, a support structure layer may be disposed between the first waveguide layer and the second waveguide layer, and the first waveguide layer and the second waveguide layer are respectively attached to two sides of the support structure layer.

Dents having openings facing at least one of the first waveguide layer and the second waveguide layer are disposed on the two sides of the support structure layer at the coupling position; or bumps facing at least one of the first waveguide layer and the second waveguide layer are disposed on the two sides of the support structure layer and at the intersection of the either optical waveguide and the intersecting optical waveguide.

When both the first waveguide layer and the second waveguide layer are made of a fluid material, a support structure layer may be disposed between the first waveguide layer and the second waveguide layer, and the distance between the optical waveguides that intersect across layers is increased by using a bump on the support structure layer; or a distance between an optical waveguide in the first waveguide layer and an optical waveguide in the second waveguide layer at the coupling position is reduced by using a dent on the support structure layer.

Optionally, the first waveguide layer is made of an electro-optical material, where the electro-optical material is a material whose refractive index can be changed under the effect of an electric field. The control component includes a controller and an electric field structure. The controller is configured to change the refractive index of the preset area in the first waveguide layer by controlling an electric field applied by the electric field structure to the first waveguide layer, to form or eliminate an optical waveguide in the first waveguide layer. In addition, the second waveguide layer may also be made of the electro-optical material.

According to a second aspect of this application, a control method for an optical waveguide apparatus is provided, where the method is applied to a control component in an optical waveguide apparatus. The optical waveguide apparatus further includes m input interfaces, n output interfaces, and a waveguide structure, where both m and n are integers greater than or equal to 1. The waveguide structure includes a first waveguide layer and a second waveguide layer. An optical waveguide exists in the second waveguide layer, and the first waveguide layer is configured to form or eliminate an optical waveguide under control of the control component. The method includes:

obtaining, by the control component, control information, where the control information is used to instruct to connect at least x input/output interface pairs; and controlling, by the control component, the first waveguide layer based on the control information, to form, in the waveguide structure, optical signal paths connecting the at least x input/output interface pairs.

An optical signal path connecting each of the at least x input/output interface pairs includes at least one optical waveguide in the first waveguide layer or the second waveguide layer, and each of the at least x input/output interface pairs may include one of the m input interfaces and one of the n output interfaces, where x is an integer greater than or equal to 1.

Optionally, the controlling, by the control component, the first waveguide layer, to form, in the waveguide structure, optical signal paths connecting the at least x input/output interface pairs includes:

adjusting, by the control component, a refractive index of a preset area in the first waveguide layer based on the control information, to form, in the waveguide structure, the optical signal paths connecting the at least x input/output interface pairs.

Optionally, optical waveguides included in the optical signal paths connecting the at least x input/output interface pairs in the first waveguide layer do not intersect; and/or optical waveguides included in the optical signal paths connecting the at least x input/output interface pairs in the second waveguide layer do not intersect.

Optionally, the method further includes:

adjusting a refractive index of a preset area in the second waveguide layer based on the control information, to form or eliminate an optical waveguide in the second waveguide layer.

According to a third aspect of this application, a storage medium is provided. The storage medium stores an instruction. When the instruction is run on a control component, the control component is enabled to perform the control method for the optical waveguide apparatus according to the second aspect.

Beneficial effects of the technical solutions provided in this application are as follows:

The control component can control the first waveguide layer to form an optical waveguide, and the optical waveguide and an optical waveguide in the second waveguide layer form a cross-layer optical signal path. In this way, another optical waveguide in the first waveguide layer can pass through the optical signal path by using a cross-layer position in the optical signal path. Intersections of optical waveguides in a same waveguide layer are reduced, so that the loss caused by the co-layer intersections is reduced, further reducing the overall loss of the optical waveguide apparatus.

DESCRIPTION OF EMBODIMENTS

To make the objectives, technical solutions, and advantages of this application clearer, the following further describes the implementations of this application in detail with reference to the accompanying drawings.

Figure 1:
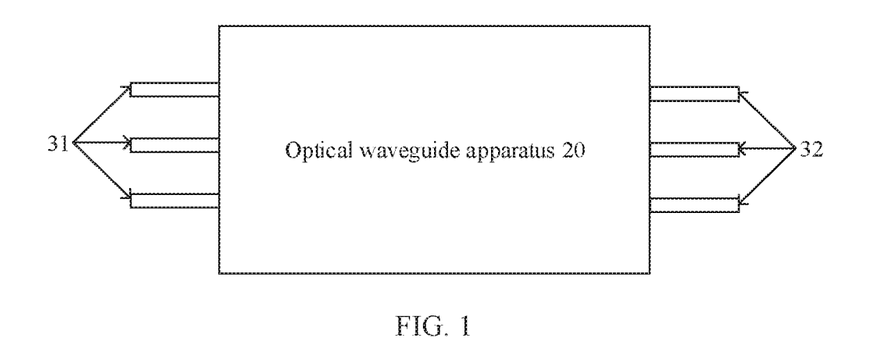
FIG. 1 is a schematic diagram of an implementation environment of an optical waveguide apparatus according to this application.

An optical waveguide apparatus provided in this application may serve as an optical signal switching apparatus or a part of an optical signal switching apparatus. For example, FIG. 1 is a schematic diagram of an implementation environment of an optical waveguide apparatus according to this application. The implementation environment may include an optical waveguide apparatus 20 and a connection structure.

The connection structure may include a plurality of input structures 31 and a plurality of output structures 32. The input structures 31 are configured to input an optical signal to the optical waveguide apparatus 20, and the output structures 32 are configured to obtain an optical signal output by the optical waveguide apparatus. The input structures 31 and the output structures 32 may be components, such as optical fibers, that can transmit an optical signal. Optionally, the optical waveguide apparatus 20 and the connection structure may alternatively be a part of an optical module, an optical chip, or another optical waveguide apparatus, and the connection structure may be a component that is inside an optical module, an optical chip, or an optical waveguide apparatus and that can transmit an optical signal, for example, an optical waveguide inside the optical module, the optical chip, or the optical waveguide apparatus.

The optical waveguide apparatus 20 may guide, to the plurality of output structures 32, an optical signal that enters the optical waveguide apparatus 20 from the plurality of input structures 31.

Optical signal paths connecting different input structures and output structures may be formed in the optical waveguide apparatus 20, to implement a function of optical signal switching (switching).

Figure 2:
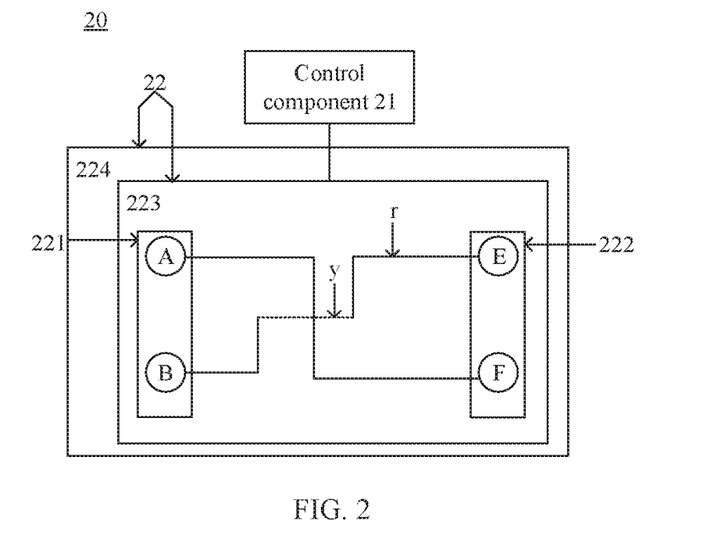
FIG. 2 is a schematic structural diagram of an optical waveguide apparatus according to an embodiment of this application.

FIG. 2 is a schematic structural diagram of an optical waveguide apparatus according to an embodiment of this application. The optical waveguide apparatus may be the optical waveguide apparatus 20 in the implementation environment shown in FIG. 1. The optical waveguide apparatus 20 may include a control component 21 and a waveguide structure 22. The waveguide structure 22 may include m input interfaces 221 and n output interfaces 222, where both m and n are integers greater than or equal to 1. FIG. 2 shows a case in which there are two input interfaces 221 (including A and B) and two output interfaces 222 (including E and F). However, there may be another quantity of input interfaces or output interfaces in the waveguide structure 22, and details are not described herein again. In addition, solid lines between the input interfaces and the output interfaces in FIG. 2 are optical waveguides in a first waveguide layer 223, and a dashed line is an optical waveguide in a second waveguide layer 224. It should be noted that the optical waveguide apparatus 20 may be a part of an optical module, an optical chip, or another optical waveguide apparatus, so that the input interfaces 221 may be internal interfaces of the optical module, the optical chip, or the optical waveguide apparatus, and the output interfaces 222 may also be internal interfaces of the optical module, the optical chip, or the optical waveguide apparatus. It is clear that the input interfaces 221 or the output interfaces 222 may alternatively be external interfaces of the optical module, the optical chip, or the optical waveguide apparatus.

The waveguide structure 22 includes the first waveguide layer 223 configured to form or eliminate an optical waveguide r under control of the control component 21.

The waveguide structure 22 further includes the second waveguide layer 224, where an optical waveguide y exists in the second waveguide layer 224. The optical waveguide y in the second waveguide layer 224 may be a fixed optical waveguide disposed in the second waveguide layer 224, or may be an optical waveguide formed by controlling the second waveguide layer 224 by the control component 21. The fixed optical waveguide is a predisposed optical waveguide that cannot be eliminated or be changed in shape by using a control component. For example, the fixed optical waveguide is an optical waveguide that is formed during fabrication of an optical waveguide apparatus and that cannot be eliminated or be changed in shape after the fabrication of the optical waveguide apparatus.

The control component 21 is configured to control the first waveguide layer 223 based on control information (the control information is used to instruct to connect at least x input/output interface pairs), to form, in the waveguide structure 22, optical signal paths connecting the at least x input/output interface pairs. The control information may be from a control apparatus outside the optical waveguide apparatus 20, or may be from a preset instruction in the control component 21.

An optical signal path connecting each input/output interface pair may include at least one optical waveguide in the first waveguide layer 223 or the second waveguide layer 224, and each input/output interface pair includes one of the m input interfaces and one of the n output interfaces, where x is an integer greater than or equal to 1.

The input/output interface pair in this application may include at least one of the following three types:

First type of input/output interface pair: Output interfaces in different input/output interface pairs are different, but input interfaces in different input/output interface pairs may be the same. In other words, one input interface may be connected to a plurality of output interfaces by using optical signal paths, so that a multicast or broadcast function of an optical signal can be implemented.

Second type of input/output interface pair: Input interfaces in different input/output interface pairs are different, but output interfaces in different input/output interface pairs may be the same. In other words, a plurality of input interfaces may be connected to one output interface by using optical signal paths, so that a combination function of optical signals can be implemented.

Third type of input/output interface pair: Input interfaces in different input/output interface pairs are different, and output interfaces in different input/output interface pairs are different.

Optionally, an optical signal path connecting each input/output interface pair may also include the following three types:

First type of optical signal path: An optical signal path connecting one input/output interface pair includes at least one optical waveguide only in the first waveguide layer 223.

Second type of optical signal path: An optical signal path connecting one input/output interface pair includes at least one optical waveguide only in the second waveguide layer 224.

Third type of optical signal path: An optical signal path connecting one input/output interface pair includes at least one optical waveguide in the first waveguide layer 223 and at least one optical waveguide in the second waveguide layer 224.

It is clear that the optical signal paths connecting the at least x input/output interface pairs may include at least one of the foregoing three types of optical signal paths.

In this embodiment of this application, the m input interfaces 221 may be disposed in the first waveguide layer 223, or may be disposed in the second waveguide layer 224, or some may be disposed in the first waveguide layer 223, and the others may be disposed in the second waveguide layer 224. The n output interfaces 222 may be disposed in the first waveguide layer 223, or may be disposed in the second waveguide layer 224, or some may be disposed in the first waveguide layer 223, and the others may be disposed in the second waveguide layer 224.

In conclusion, in the optical waveguide apparatus provided in this embodiment of this application, the control component can control the first waveguide layer to form an optical waveguide, and the optical waveguide and an optical waveguide in the second waveguide layer form a cross-layer optical signal path. In this way, another optical waveguide in the first waveguide layer can pass through the optical signal path by using a cross-layer position in the optical signal path. Intersections of optical waveguides in a same waveguide layer are reduced, and a loss caused by co-layer intersections is reduced, further reducing an overall loss of the optical waveguide apparatus.

In the optical waveguide apparatus shown in FIG. 2, the second waveguide layer 224 may be a fixed waveguide layer in which a fixed optical waveguide is disposed, or may be a waveguide layer that can form or eliminate an optical waveguide under control of the control component. The fixed optical waveguide is a predisposed optical waveguide that cannot be formed or eliminated by using the control component. In particular, the fixed optical waveguide is an optical waveguide that is formed during fabrication of an optical waveguide apparatus and that cannot be eliminated or be changed in shape after the fabrication of the optical waveguide apparatus. The following provides descriptions separately.

Figure 3:
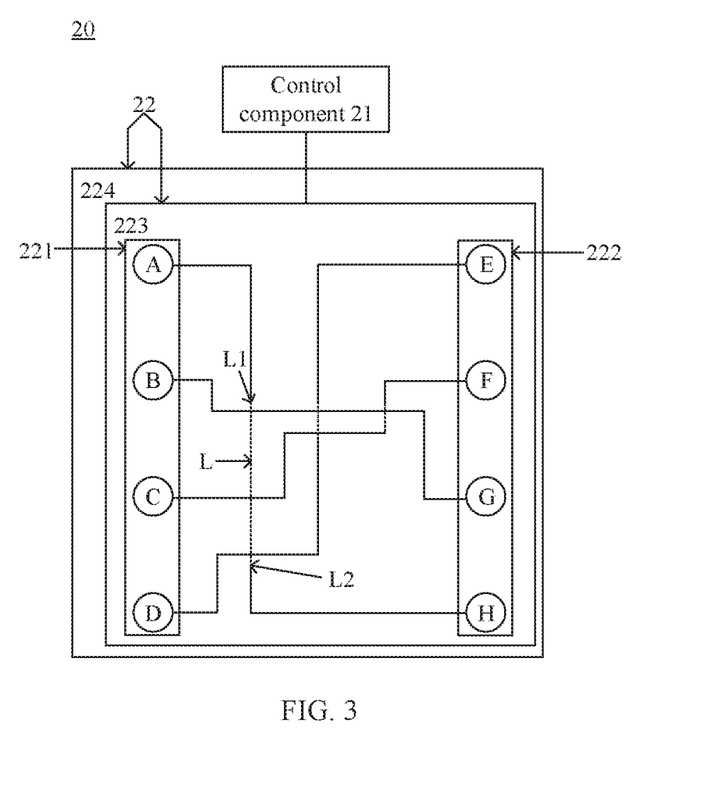
FIG. 3 is a schematic structural diagram of another optical waveguide apparatus according to an embodiment of this application.

When the second waveguide layer in the optical waveguide apparatus shown in FIG. 2 is a fixed waveguide layer in which a fixed optical waveguide is disposed, a structure of an optical waveguide apparatus provided in an embodiment of this application may be shown in FIG. 3. The control component 21 in the optical waveguide apparatus 20 may be connected to the first waveguide layer 223, to control the first waveguide layer 223 to form or eliminate an optical waveguide.

A plurality of fixed optical waveguides are disposed in the second waveguide layer 224 of the optical waveguide apparatus 20 shown in FIG. 3. These fixed optical waveguides may be optical waveguides formed by using a conventional technique, for example, may be silicon waveguides implemented by using a silicon photonics technology, or silica waveguides implemented by using a PLC (Planar Lightwave Circuit, planar lightwave circuit) technology. A quantity of fixed optical waveguides in the second waveguide layer 224 may be positively correlated with a quantity of input interfaces. In other words, a larger quantity of input interfaces indicates a larger quantity of fixed optical waveguides. FIG. 3 shows a case in which there are four input interfaces 221 (including A, B, C, and D) and four output interfaces 222 (including E, F, G, and H). However, there may be another quantity of input interfaces or output interfaces in the waveguide structure 22, and details are not described herein again. In addition, solid lines between the input interfaces and the output interfaces in FIG. 3 are optical waveguides in the first waveguide layer 223, and dashed lines are optical waveguides in the second waveguide layer 224.

In the waveguide structure 22 of the optical waveguide apparatus shown in FIG. 3, a plurality of optical signal paths connecting the input interfaces and the output interfaces may include some or all of a first type of optical signal path, a second type of optical signal path, and a third type of optical signal path. The first type of optical signal path is an optical signal path including an optical waveguide only in the first waveguide layer 223, the second type of optical signal path is an optical signal path including an optical waveguide only in the second waveguide layer 224, and the third type of optical signal path is an optical signal path including an optical waveguide in the first waveguide layer 223 and an optical waveguide in the second waveguide layer 224. (FIG. 3 shows a case in which the third type of optical signal path and the first type of optical signal path are included, but the waveguide structure 22 may further include the second type of optical signal path. The input interfaces 221 and the output interfaces 222 shown in FIG. 3 are all in the first waveguide layer 223. Actually, the input interfaces 221 or the output interfaces 222 may be some or all in the second waveguide layer 224. When the input interfaces 221 or the output interfaces 222 are some or all in the second waveguide layer 224, an optical waveguide in the second waveguide layer 224 can form the second type of optical signal path.) When the optical waveguide apparatus runs, the control component 21 receives control information used to instruct to connect at least x input/output interface pairs, and the control component may control, based on the control information, the first waveguide layer 223 to form an optical waveguide. The optical waveguide formed in the first waveguide layer 223 may form the first type of optical signal path, or may be an optical waveguide in the first waveguide layer in the third type of optical signal path. An area (the area may be an area through which an optical waveguide passes in the first waveguide layer), in the first waveguide layer, in which the optical waveguide formed in the first waveguide layer 223 is located may be predetermined. For example, a designer may predetermine a location of the area in which the optical waveguide formed in the first waveguide layer is located, and write the data into the control component. Alternatively, the area, in the first waveguide layer, in which the optical waveguide formed in the first waveguide layer 223 is located may be determined by the control component 21 in real time according to a preset rule. For example, the preset rule is: An optical signal path connecting the input interface A in the first waveguide layer and the output interface H in the first waveguide layer includes an optical waveguide L in the second waveguide layer 224, two ends of the optical waveguide L are L1 and L2, and the control component 21 may control the first waveguide layer 223 to form an optical waveguide from the input interface A to near the end L1 of the optical waveguide L, and then form an optical waveguide from the output interface H to the end L2 of the optical waveguide L.

When the optical waveguide apparatus runs, the received control information may change. Input/output interface pairs that subsequently received control information instructs to connect may be completely or partially different from the input/output interface pairs that the received control information instructs to connect. If the input/output interface pairs that the subsequently received control information instructs to connect are partially different from the input/output interface pairs that the received control information instructs to connect, the control component may adjust an optical signal path only between the different input/output interface pairs. (The adjustment may include: eliminating an optical waveguide, in the first waveguide layer, in an optical signal path connecting an input/output interface pair that the received control information instructs to connect whereas the subsequently received control information does not instruct to connect; and forming an optical waveguide, in the first waveguide layer, in an optical signal path connecting an input/output interface pair that the received control information does not instruct to connect whereas the subsequently received control information instructs to connect.) However, in this case, optical signal paths that do not need to be adjusted (optical signal paths that the received control information and the subsequently received control information instruct to form or optical signal paths that the received control information and the subsequently received control information do not instruct to change are the optical signal paths that do not need to be adjusted) exist in the first waveguide layer. These optical signal paths may block an optical waveguide in the first waveguide layer in optical signal paths that need to be adjusted. In addition, because no optical waveguide is predisposed in the second waveguide layer for each optical signal path, in some optical signal paths that need to be adjusted, when facing a blocked optical waveguide, an optical waveguide in the first waveguide layer may not use an optical waveguide in the second waveguide layer to cross the blocked optical waveguide. For example, if the control information instructs to form, in the optical waveguide apparatus shown in FIG. 3, an optical signal path connecting the input interface A and the output interface H, and an optical signal path connecting the input interface D and the output interface E, after the optical signal path connecting the input interface D and the output interface E is formed, as shown in FIG. 4, optical waveguides r1 and r2 in the first waveguide layer 223 prevent an optical waveguide from being formed between the input interface A and an optical waveguide y1 in the second waveguide layer 224.

Figure 4:
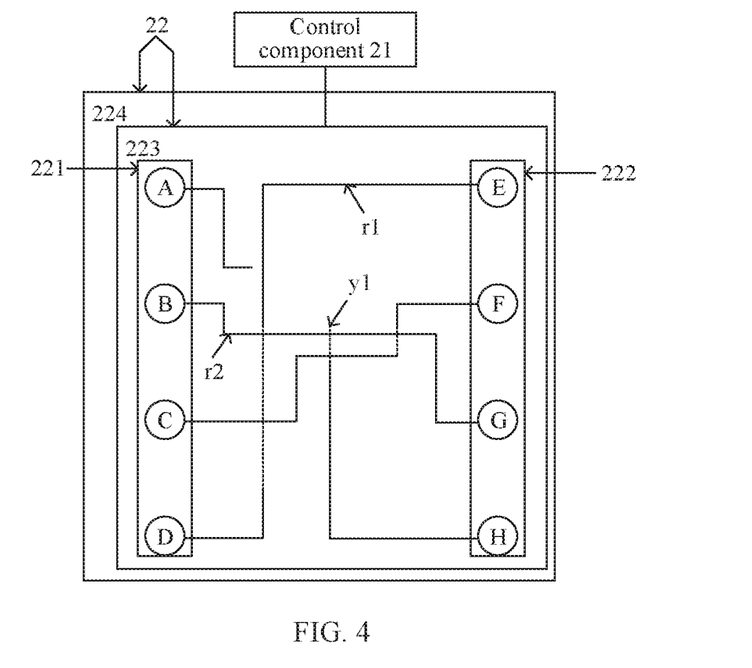
FIG. 4 is a schematic diagram of an optical waveguide in the optical waveguide apparatus shown in FIG. 3.
Figure 5:
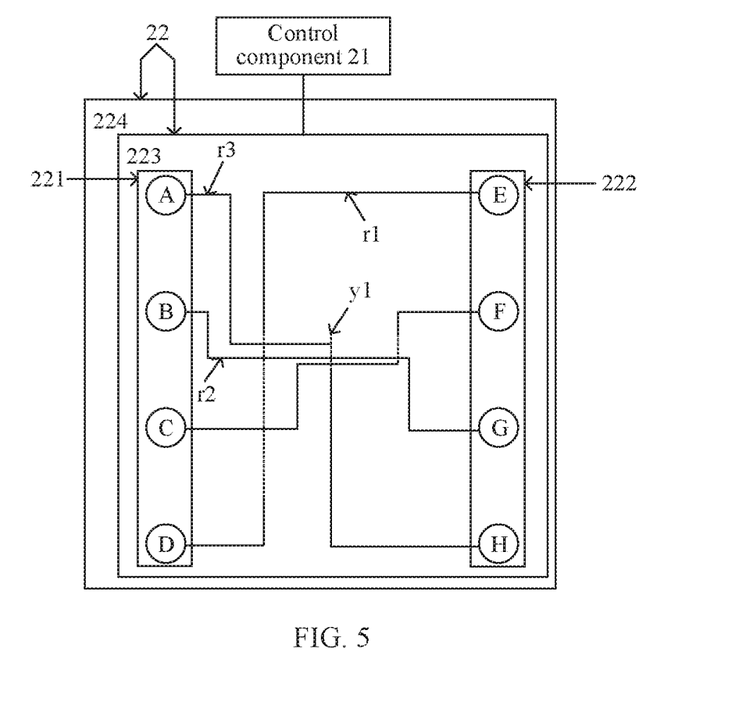
FIG. 5 is a schematic structural diagram obtained after an adjustment to an area in which the optical waveguide in the optical waveguide apparatus shown in FIG. 4 is located.

There are two solutions for the optical waveguide apparatus shown in FIG. 4. One solution is to directly form an optical waveguide intersecting with the blocked optical waveguide, and use the intersecting optical waveguide to form an optical signal path. To be specific, an optical waveguide co-layer intersecting with the optical waveguide r1 is formed in the first waveguide layer 223, an optical signal path is formed between the input interface A and the optical waveguide y1 by using the optical waveguide co-layer intersecting with the optical waveguide r1, and an optical signal path connecting the input interface A and the output interface H can further be formed in the waveguide structure 22. However, in this solution, a loss of the optical waveguide apparatus is increased due to a co-layer intersection of optical waveguides. The other solution is to adjust an area in which the blocked optical waveguide is located, to reserve an area in which an optical waveguide (the optical waveguide is an optical waveguide in the first waveguide layer) in an optical signal path that needs to be adjusted is formed, that is, to adjust an area in which the optical waveguide r1 or the optical waveguide r2 or both are located, to reserve an area in which an optical waveguide from the input interface A to the optical waveguide y1 is formed. For example, FIG. 5 is schematic structural diagram obtained by forming an optical waveguide r3 from the input port A to the optical waveguide y1 after an adjustment to the area in which the optical waveguide r2 in the optical waveguide apparatus shown in FIG. 4 is located. In this manner, although there is no additional loss caused by the co-layer intersection of the optical waveguides, the optical signal paths that do not need to be adjusted are affected. In other words, a lossless switching function (the lossless switching function may be such a function that during an adjustment to optical signal paths in the optical waveguide apparatus that are between some input/output interface pairs and that need to be adjusted as indicated by the control information, other optical signal paths that are between input/output interface pairs and that do not need to be adjusted as indicated by the control information are not adjusted) of the optical waveguide apparatus cannot be implemented.

For meanings of other reference signs in FIG. 4 and FIG. 5, refer to FIG. 3. Details are not described herein again.

Figure 6:
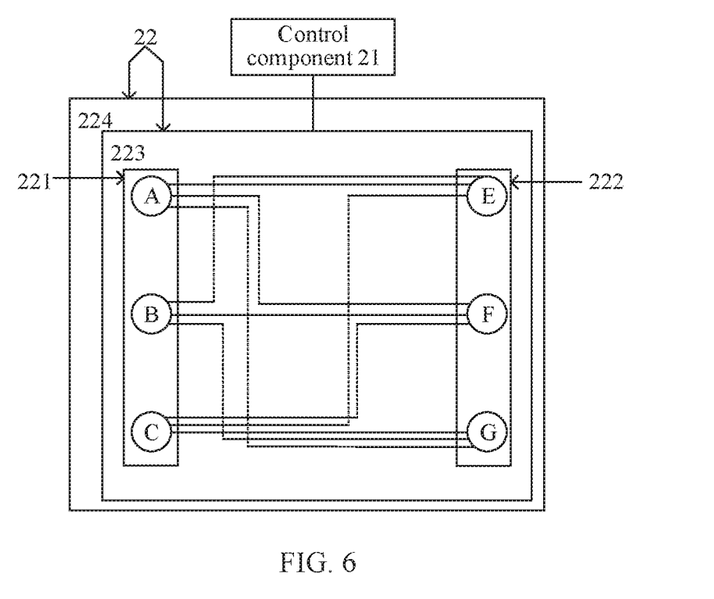
FIG. 6 is a schematic structural diagram of another optical waveguide apparatus according to an embodiment of this application.

FIG. 6 shows another optical waveguide apparatus provided in this application. In the optical waveguide apparatus, each optical waveguide in the second waveguide layer 224 corresponds to one input/output interface pair (that is, input/output interface pairs corresponding to different optical waveguides in the second waveguide layer 224 are different). Any optical waveguide in the second waveguide layer 224 and an optical waveguide in the first waveguide layer 223 may be configured to form an optical signal path connecting an input/output interface pair corresponding to the any optical waveguide.

In the optical waveguide apparatus shown in FIG. 6, because each optical waveguide in the second waveguide layer 224 is an optical waveguide dedicated for one input/output interface, optical signal paths connecting any two input/output interface pairs do not share an optical waveguide in the second waveguide layer 224. Based on this, areas in which optical waveguides in all optical signal paths connecting input/output interface pairs are located may be predetermined. (Each input interface in different input/output interface pairs may be connected to different output interfaces, and each output interface in different input/output interface pairs may also be connected to different input interfaces. Generally, all possible optical signal paths connecting input/output interface pairs do not simultaneously occur in a waveguide structure, but only some optical signal paths connecting input/output interface pairs simultaneously occur in the waveguide structure.) In addition, the optical signal paths connecting the any two input/output interface pairs do not intersect in a same waveguide layer. In this way, when input/output interface pairs that two pieces of control information consecutively received by the control component 21 separately instruct to connect are different, the control component 21 can form, in the first waveguide layer without changing the optical signal paths that do not need to be adjusted, an optical waveguide in an optical signal path that needs to be adjusted. In this way, the lossless switching function of the optical waveguide apparatus is implemented. It should be noted that because all possible input/output interface pairs in a waveguide structure shown in FIG. 6 are considered, the waveguide structure shown in FIG. 6 can support a lossless switching function in various cases, including but not limited to any one or more of the following cases: Output interfaces in different input/output interface pairs are different, but input interfaces in different input/output interface pairs may be the same; input interfaces in different input/output interface pairs are different, but output interfaces in different input/output interface pairs may be the same; and input interfaces in different input/output interface pairs are different, and output interfaces in different input/output interface pairs are different.

FIG. 6 shows a case in which there are three input interfaces 221 (including A, B, and C) and three output interfaces 222 (including E, F, and G). However, there may be another quantity of input interfaces or output interfaces in the waveguide structure 22, and details are not described herein again.

Optical waveguides in the second waveguide layer in the optical waveguide apparatus shown in FIG. 6 may be disposed according to a specific rule. Optionally, m input interfaces and n output interfaces are arranged in a specific direction. Each of the in input interfaces corresponds to one sequence number. The sequence number progressively increases in the specific direction. The smallest sequence number is 1, and the largest sequence number is m. Each of the n output interfaces corresponds to one sequence number. The sequence number progressively increases in the specific direction. The smallest sequence number is 1, and the largest sequence number is n.

In this case, for optical signal paths whose sequence numbers of input interfaces are less than sequence numbers of output interfaces, when a plurality of optical waveguides in the second waveguide layer in optical signal paths whose input interfaces have a same sequence number of w (w is any value greater than or equal to 1 and less than or equal to m) are disposed, the plurality of optical waveguides may be arranged based on sequence numbers of output interfaces of these optical signal paths. In addition, an optical waveguide in an optical signal path whose output interface has a larger sequence number is closer to the m input interfaces. When a plurality of optical waveguides in the second waveguide layer in optical signal paths whose Output interfaces have a same sequence number of v (v is any value greater than or equal to 1 and less than or equal to m) are disposed, the plurality of optical waveguides may be arranged based on sequence numbers of input interfaces of these optical signal paths. In addition, an optical waveguide in an optical signal path whose input interface has a larger sequence number is closer to the m input interfaces.

For optical signal paths whose sequence numbers of input interfaces are greater than sequence numbers of output interfaces, when a plurality of optical waveguides in the second waveguide layer in optical signal paths whose input interfaces have a same sequence number of w are disposed, the plurality of optical waveguides may be arranged based on sequence numbers of output interfaces of these optical signal paths. In addition, an optical waveguide in an optical signal path whose output interface has a larger sequence number is closer to the n output interfaces. When a plurality of optical waveguides in the second waveguide layer in optical signal paths whose output interfaces have a same sequence number of v are disposed, the plurality of optical waveguides may be arranged based on sequence numbers of input interfaces of these optical signal paths. In addition, an optical waveguide in an optical signal path whose input interface has a larger sequence number is closer to the n output interfaces.

Figure 7:
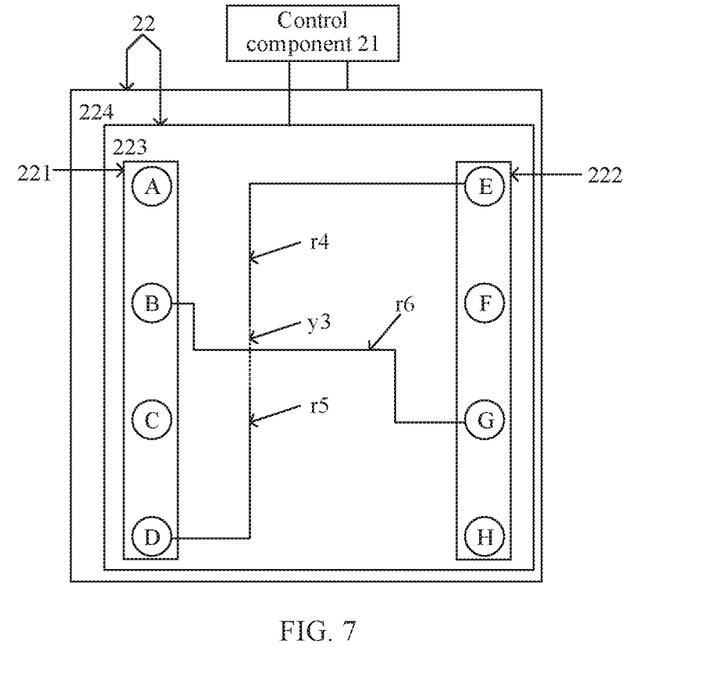
FIG. 7 is a schematic structural diagram of another optical waveguide apparatus according to an embodiment of this application.

When the second waveguide layer in the optical waveguide apparatus shown in FIG. 2 is a waveguide layer that can form or eliminate an optical waveguide under control of the control component, a structure of an optical waveguide apparatus provided in an embodiment of this application may be shown in FIG. 7. The control component 21 in the optical waveguide apparatus 20 may be connected to the first waveguide layer 223 and the second waveguide layer 224, to control the first waveguide layer 223 and the second waveguide layer 224 to form or eliminate an optical waveguide.

Although the optical waveguide apparatus shown in FIG. 6 can implement a lossless switching function, when there are a relatively large quantity of input interfaces and output interfaces, a quantity of fixed optical waveguides predisposed in the second waveguide layer sharply increases. Further, a quantity of cross-layer intersections of optical waveguides in the first waveguide layer and optical waveguides in the second waveguide layer also sharply increases, and the cross-layer intersections cause a specific loss. Because both the first waveguide layer 223 and the second waveguide layer 224 shown in FIG. 7 can form or eliminate an optical waveguide under control of the control component, there is no need to predispose a large quantity of optical waveguides in the second waveguide layer. After receiving control information, the control component 21 may form, in the two waveguide layers based on the control information, an optical signal path between an input/output interface pair that the control information instructs to connect. FIG. 7 shows a case in which the control information instructs to connect an input interface B and an output interface G, and also instructs to connect an input interface D and an output interface E. The control component 21 controls the second waveguide layer 224 to form an optical waveguide y3, and controls the first waveguide layer 23 to form optical waveguides r4, r5, and r6. In this way, there is only one cross-layer intersection, greatly reducing the loss caused by the cross-layer intersections.

Each optical waveguide apparatus provided in the embodiments of this application includes at least one waveguide layer that can form or eliminate an optical waveguide under control of a control component, and the waveguide layer may be referred to as a configuration waveguide layer.

Figure 8:
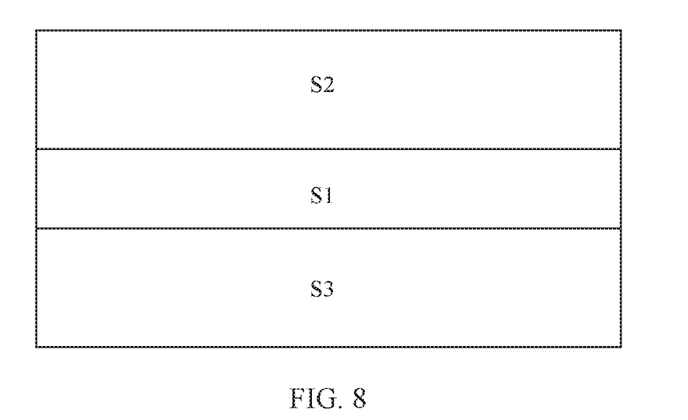
FIG. 8 is a schematic diagram of a configuration waveguide layer according to an embodiment of this application.

Optionally, the control component is configured to adjust a refractive index of a preset area in the configuration waveguide layer based on control information, to form or eliminate an optical waveguide in the configuration waveguide layer. For example, FIG. 8 is a schematic diagram of the configuration waveguide layer. The control component may change a refractive index of an area S1, and make the refractive index greater than a refractive index of an area S2 and a refractive index of an area S3, to form an optical waveguide in the area S1, or the control component may change the refractive index of the area S2 and the refractive index of the area S3, and make both the refractive index of the area S2 and the refractive index of the area S3 less than the refractive index of the area S1, to form an optical waveguide in the area S1. An optical signal may be transmitted in a length direction of the area S1.

A manner of changing a refractive index of the configuration waveguide layer varies with a material of the configuration waveguide layer. Optionally, the configuration waveguide layer may be made of an electro-optical material. The electro-optical material is a material whose refractive index can be changed under the effect of an electric field. For example, the electro-optical material may be a liquid crystal.

When the configuration waveguide layer is made of the electro-optical material, the control component in the optical waveguide apparatus provided in this application may include a controller and an electric field structure. The controller is configured to change the refractive index of the preset area in the configuration waveguide layer by controlling an electric field applied by the electric field structure to the configuration waveguide layer, to form or eliminate an optical waveguide in the configuration waveguide layer.

Figure 9:
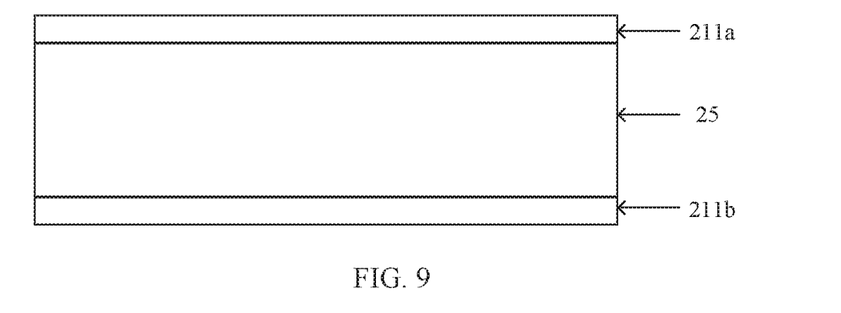
FIG. 9 is a schematic structural diagram of any configuration waveguide layer in an optical waveguide apparatus according to this application.

FIG. 9 is a schematic structural diagram of any configuration waveguide layer in an optical waveguide apparatus according to this application. The optical waveguide apparatus includes two sub-electric field structures 211a and 211b that are configured to apply an electric field to a configuration waveguide layer 25. The two sub-electric field structures 211a and 211b may be disposed on two sides of the configuration waveguide layer 25 (as shown in FIG. 9), or the two sub-electric field structures 211a and 211b may be disposed on a same side of the configuration waveguide layer 25.

For structures of the two sub-electric field structures 211a and 211b, there may be two cases: In a first case, one of the two sub-electric field structures 211a and 211b includes a plurality of electrodes arranged in an array, and the other is a planar electrode (the planar electrode may be configured to provide a constant voltage). In a second case, the two sub-electric field structures 211a and 211b each include a plurality of electrodes arranged in an array. By using the two structures, electric fields applied to different areas in the configuration waveguide layer can be controlled, to form optical waveguides in different areas in the configuration waveguide layer.

Figure 10:
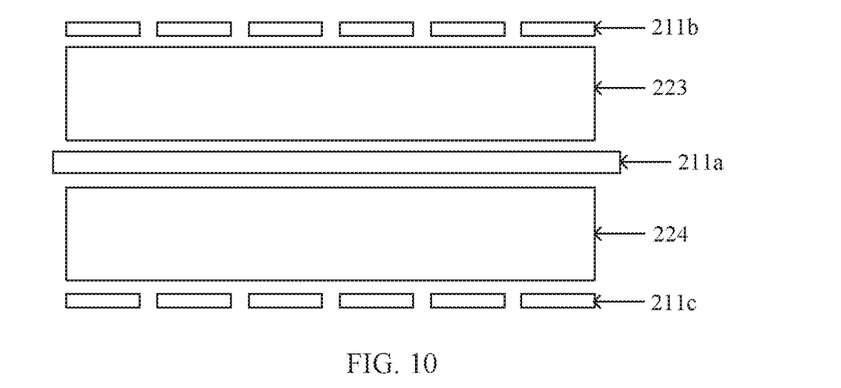
FIG. 10 is a side view of the optical waveguide apparatus shown in FIG. 7.

For the optical waveguide apparatus shown in FIG. 7 in which the two waveguide layers are both configuration waveguide layers, a side view of the optical waveguide apparatus may be shown in FIG. 10. Sub-electric field structures (211b and 211c) that each include a plurality of electrodes arranged in an array are respectively disposed on outer sides of the first waveguide layer 223 and the second waveguide layer 224, and a shared planar electrode 211a is disposed between the first waveguide layer 223 and the second waveguide layer 224. By using the three electric field structures, the first waveguide layer 223 and the second waveguide layer 224 can be controlled to form or eliminate an optical waveguide.

Figure 11:
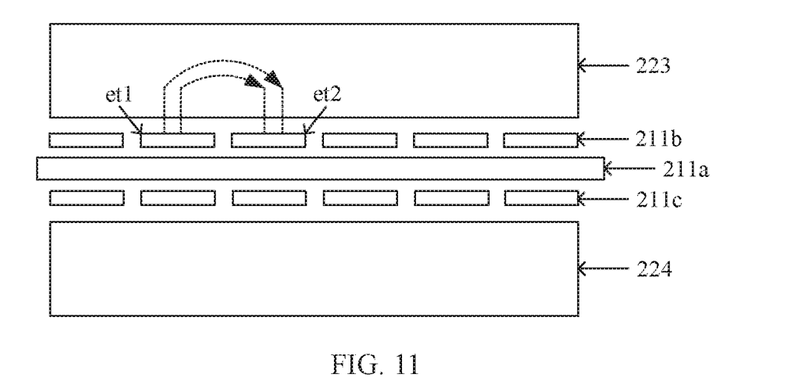
FIG. 11 is a schematic structural diagram of another optical waveguide apparatus according to an embodiment of this application.

In addition, FIG. 11 is a schematic structural diagram obtained after the sub-electric field structures respectively disposed on the outer sides of the first waveguide layer and the second waveguide layer in the optical waveguide apparatus in FIG. 10 are disposed on two sides of the planar electrode 211a. The planar electrode 211a (for example, the planar electrode 211a may be a ground electrode) is configured to provide a constant voltage. By applying different voltages to the sub-electric field structures (211b and 211c), electric fields of different magnitudes can be applied to different areas in the first waveguide layer 223 or the second waveguide layer 224. For example, different voltages may be applied to two adjacent electrodes et1 and et2 in the sub-electric field structure 211b in FIG. 11, to form a lateral (a lateral direction is a direction parallel to a connection line between et1 and et2) electric field between the electrodes et1 and et2. In this manner, the electric fields of different magnitudes may be formed in different areas in the first waveguide layer and the second waveguide layer, to form or eliminate an optical waveguide in the first waveguide layer 223 and the second waveguide layer 224. The planar electrode 211*a* may prevent electric fields generated by the sub-electric field structures on the two sides of the planar electrode 211*a* from affecting each other.

Optionally, when an electric field structure is disposed between two configuration waveguide layers, the electric field structure may be made of a transparent conductive material, to prevent the electric field structure from blocking transmission of an optical signal between the two waveguide layers. Optionally, the transparent conductive material is indium tin oxide (Indium tin oxide, ITO).

Figure 12:
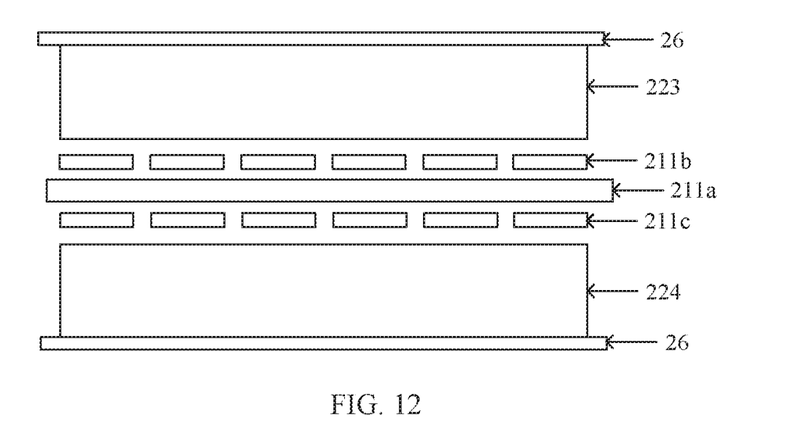
FIG. 12 is a schematic structural diagram of another optical waveguide apparatus according to an embodiment of this application.

Optionally, FIG. 12 is a schematic structural diagram obtained after an overlay layer 26 is disposed on each of the outer sides of the first waveguide layer and the second waveguide layer in the optical waveguide apparatus shown in FIG. 11. A refractive index of the overlay layer 26 is less than a refractive index of an area in which an optical waveguide is formed in the first waveguide layer 223 or the second waveguide layer 224. The overlay layer 26 can prevent optical signals in optical waveguides in the first waveguide layer 223 and the second waveguide layer 224 from overflowing to the outside of the optical waveguide apparatus. In addition, when an electric field structure is disposed on each of the outer sides of the first waveguide layer and the second waveguide layer, the electric field structure may be formed by using a material having a refractive index less than the refractive index of the area in which the optical waveguide is formed in the first waveguide layer or the second waveguide layer. In other words, the electric field structure may be reused as an overlay layer.

In addition, the configuration waveguide layer may alternatively be made of a magneto-optical material (namely, a material whose refractive index can be changed under the effect of a magnetic field) or a thermo-optical material (namely, a material whose refractive index can be changed under the effect of heat). The control component may also include a device configured to control the refractive index of the magneto-optical material or a device configured to control the refractive index of the thermo-optical material. This is not limited in this embodiment of the present invention.

In an optical waveguide apparatus provided in this application, a control component may control, based on control information, a waveguide structure to form optical signal paths connecting at least x input/output interface pairs. A cross-layer optical signal path (namely, the third type of optical signal path described above) that includes at least one optical waveguide in the first waveguide layer and at least one optical waveguide in the second waveguide layer exists in the optical signal paths connecting the at least x input/output interface pairs. An optical signal can enter the second waveguide layer from the first waveguide layer or enter the first waveguide layer from the second waveguide layer through a coupling position (the coupling position is a position, in each of the foregoing accompanying drawings, at which optical waveguides in different layers in any optical signal path intersect) between two adjacent optical waveguides in different waveguide layers in the cross-layer optical signal path. A minimum distance between the two optical waveguides at the coupling position is less than an intersecting waveguide distance, where the intersecting waveguide distance is a minimum distance between either of the two optical waveguides and an intersecting optical waveguide, and the intersecting optical waveguide is an optical waveguide that is in a different waveguide layer and that intersects with the either optical waveguide.

Figure 13:
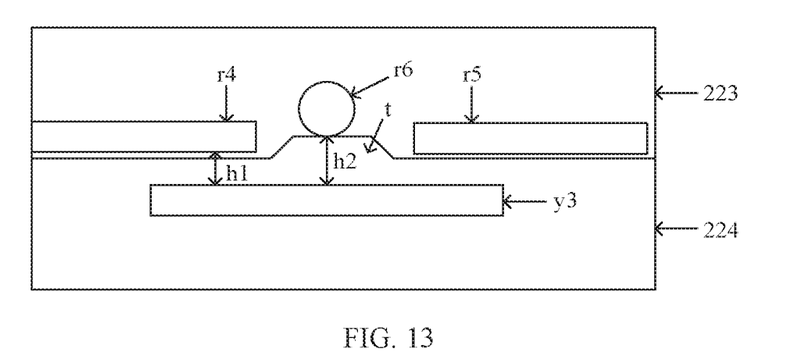
FIG. 13 is a sectional view of an optical waveguide apparatus at any coupling position according to this application.

FIG. 13 is a sectional view of an optical waveguide apparatus at any coupling position according to this application. In the figure, the optical waveguides r4, y3, and r5 are optical waveguides in an optical signal path. The optical waveguide r6 is an intersecting optical waveguide of the optical waveguide y3. It can be learned that a minimum distance h2 between the optical waveguides r6 and y3 is greater than a minimum distance h1 between the optical waveguides r4 and y3. In this way, a loss caused by cross-layer transmission of an optical signal can be reduced, and a loss caused by a cross-layer intersection can be reduced. The first waveguide layer 223 and the second waveguide layer 224 in FIG. 13 are attached to each other. Therefore, in the optical waveguide apparatus shown in FIG. 13, a bump t facing the first waveguide layer 223 may be disposed on the second waveguide layer 224 at an intersection of the optical waveguide y3 and the intersecting optical waveguide r6 to increase the distance h2 between the optical waveguides that intersect across layers. In addition, the distance h1 between the optical waveguides (r4 and y3, or r5 and y3) at the coupling position is reduced. The bump t may be formed on the second waveguide layer 224 during fabrication of the second waveguide layer 224. If the first waveguide layer is made of a fluid material (for example, a liquid crystal), after being disposed on the second waveguide layer, the first waveguide layer can be attached to the second waveguide layer. If the first waveguide layer is not made of a fluid material, a dent corresponding to the bump t may be predisposed in the first waveguide layer, so that the first waveguide layer can be attached to the second waveguide layer.

Because an optical waveguide apparatus provided in this application includes m input interfaces and n output interfaces, where both m and n are integers greater than or equal to 1. Therefore, when there are a relatively large quantity of input interfaces and/or output interfaces, there are also a relatively large quantity of cross-layer intersections in the waveguide structure. Although a loss caused by a cross-layer intersection to an optical signal is smaller than that caused by a co-layer intersection, an overall loss may still be relatively large when there are a relatively large quantity of cross-layer intersections. The loss caused by the cross-layer intersection may be greatly reduced and even be negligible by disposing a bump at the intersection. If the loss caused by the cross-layer intersection is negligible, a loss of the optical signal paths connecting the at least x input/output interfaces according to the foregoing embodiments is basically irrelevant to a quantity of input interfaces and/or output interfaces. To be specific, an overall loss of an optical waveguide apparatus provided in this application is basically constant regardless of the quantity of input interfaces and/or output interfaces. However, in a related technology, the overall loss of the optical waveguide apparatus increases with an increase in the quantity of input interfaces and/or output interfaces. Therefore, an optical waveguide apparatus provided in this application more easily supports a larger quantity of input interfaces and/or output interfaces than that in the prior art. To be specific, an optical switching capacity supported by an optical waveguide apparatus provided in this application is larger.

In addition, a bump is added at the intersection, so that a loss at a cross-layer intersection meets a requirement, and in addition, the distance h1 between the optical waveguides at the coupling position may be reduced to be small enough. In this way, a loss caused when an optical waveguide is coupled at the coupling position can be reduced, and an overall loss of the optical waveguide apparatus can further be reduced.

Figure 14:
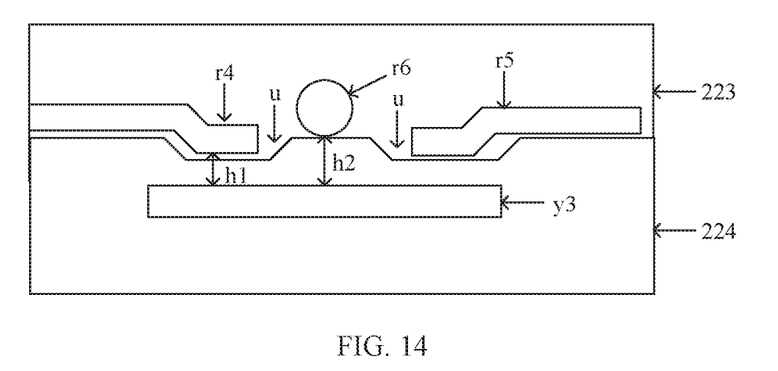
FIG. 14 is a sectional view of another optical waveguide apparatus at any coupling position according to this application.

In addition, as shown in FIG. 14, a dent u may be disposed at the coupling position to increase the distance h2 between the optical waveguides (y3 and r6) that intersect across layers and reduce the minimum distance h1 between the optical waveguides (r4 and y3, or r5 and y3) at the coupling position. For meanings of other reference signs in FIG. 14, refer to FIG. 13. Details are not described herein again. The dent u may be formed in the second waveguide layer 224 during fabrication of the second waveguide layer 224. If the first waveguide layer is made of a fluid material (for example, a liquid crystal), after being disposed on the second waveguide layer, the first waveguide layer can be attached to the second waveguide layer. If the first waveguide layer is not made of a fluid material, a bump corresponding to the dent u may be predisposed on the first waveguide layer, so that the first waveguide layer can be attached to the second waveguide layer. As shown in FIG. 14, when the dent u is disposed at the coupling position, a part of the optical waveguide r4 and/or the optical waveguide r5 may be located in the dent, so that the minimum distance h1 between the optical waveguides at the coupling position is smaller, further reducing a loss caused when an optical waveguide is coupled at the coupling position. In particular, when the first waveguide layer is made of a fluid material, during processing, fluidity of the material more easily enables a part, at the coupling position, of an optical waveguide in the first waveguide layer to be located in a dent. Similarly, as shown in FIG. 13, when the first waveguide layer is made of a fluid material, during processing, fluidity of the material more easily enables an intersecting optical waveguide in the first waveguide layer to pass, at the intersection, through a bump.

Similar to that shown in FIG. 13, in FIG. 14, a loss caused when an optical waveguide is coupled at the coupling position may be reduced by disposing a dent at the coupling position. The loss caused when the optical waveguide is coupled at the coupling position is reduced, and a proper minimum distance between optical waveguides at a cross-layer intersection may be designed, so that a loss caused by a cross-layer intersection is greatly reduced and is even negligible, further reducing an overall loss of an optical waveguide apparatus and support a larger quantity of input interfaces and/or output interfaces (support a larger optical switching capacity).

Figure 15:
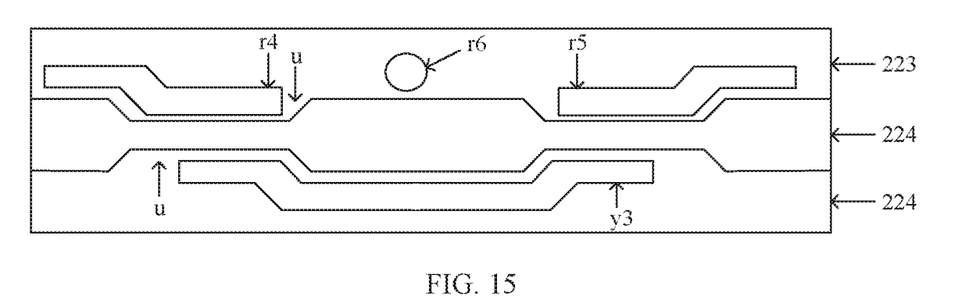
FIG. 15 is a sectional view of another optical waveguide apparatus at any coupling position according to this application.

Optionally, as shown in FIG. 15, a support structure layer 225 may be disposed between the first waveguide layer 223 and the second waveguide layer 224, and the first waveguide layer 223 and the second waveguide layer 224 are respectively attached to two sides of the support structure layer 225.

Dents u having openings facing the first waveguide layer 223 and the second waveguide layer 224 are respectively disposed on the two sides of the support structure layer 225 at the coupling position (as shown in FIG. 15), or bumps facing the first waveguide layer and the second waveguide layer are respectively disposed on the two sides of the support structure layer 225 at an intersection of any optical waveguide and an intersecting optical waveguide. When both the first waveguide layer and the second waveguide layer are made of a fluid material, it may be difficult to directly form a bump or a dent on the first waveguide layer and the second waveguide layer. Therefore, the first waveguide layer and the second waveguide layer may be attached to the two sides of the support structure layer on which a bump or a dent is formed, and the bump on the support structure layer is configured to increase a distance between optical waveguides that intersect across layers (increasing the distance can reduce an insertion loss caused by a cross-layer intersection), or the dent in the support structure layer is configured to reduce a distance between an optical waveguide in the first waveguide layer and an optical waveguide in the second waveguide layer at the coupling position (reducing the distance can reduce an insertion loss caused by cross-layer transmission of an optical signal). It is clear that an effect similar to that of the structures shown in FIG. 13 and FIG. 14 can also be achieved by using a bump or a dent on the support structure shown in FIG. 15. Details are not described again.

The support structure layer 225 shown in FIG. 15 may also be used as the electric field structure according to the foregoing embodiments.

The bump and the dent may be disposed in two manners: In one manner, when all optical signal paths in the waveguide structure are determined, a coupling position and a position at which a cross-layer intersection of optical waveguides exist may be determined based on positions of the optical signal paths, and humps and dents may further be disposed at these positions. In the other manner, when not all optical signal paths are determined, a specific quantity of bumps and dents may be first disposed in the waveguide structure (or the support structure layer). When a control component receives control information, an optical waveguide may be formed based on positions of these bumps and dents, so that some or all coupling positions are located in the dents, and some or all positions of cross-layer intersections of optical waveguides are located in the bumps. It should be noted that, in addition to the first waveguide layer and the second waveguide layer, the optical waveguide apparatus provided in this application may include more waveguide layers. The more waveguide layers may be fixed waveguide layers, or may be configuration waveguide layers. This is not limited in this embodiment of this application.

In conclusion, in the optical waveguide apparatus provided in this embodiment of this application, the control component can control the first waveguide layer to form an optical waveguide, and the optical waveguide and an optical waveguide in the second waveguide layer form a cross-layer optical signal path. In this way, another optical waveguide in the first waveguide layer can pass through the optical signal path by using a cross-layer position in the optical signal path. Intersections of optical waveguides in a same waveguide layer are reduced, and a loss caused by co-layer intersections is reduced, further reducing an overall loss of the optical waveguide apparatus.

Figure 16:
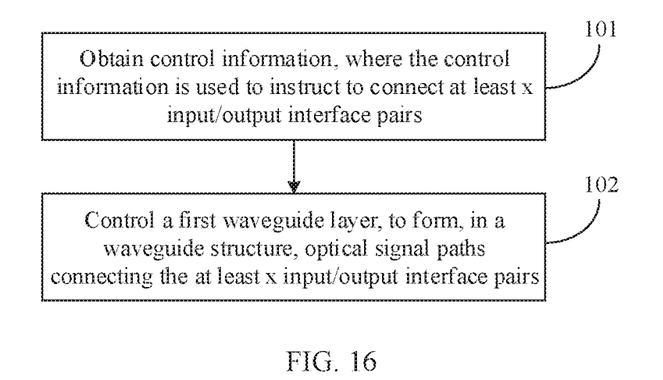
FIG. 16 is a flowchart of a control method for an optical waveguide apparatus according to this application.

FIG. 16 is a flowchart of a control method for an optical waveguide apparatus according to this application. The method is applied to the control component in the optical waveguide apparatus provided in the foregoing embodiments, and the method includes:

Step 101: Obtain control information, where the control information is used to instruct to connect at least x input/output interface pairs.

Step 102: Control a first waveguide layer, to form, in a waveguide structure, optical signal paths connecting the at least x input/output interface pairs.

An optical signal path connecting each of the at least x input/output interface pairs includes at least one optical waveguide in the first waveguide layer or a second waveguide layer, and each of the at least x input/output interface pairs includes one of m input interfaces and one of n output interfaces, where x is an integer greater than or equal to 1.

Optionally, step 102 includes: adjusting a refractive index of a preset area in the first waveguide layer based on the control information, to form, in the waveguide structure, the optical signal paths connecting the at least x input/output interface pairs.

Optionally, optical waveguides included in the optical signal paths connecting the at least x input/output interface pairs in the first waveguide layer do not intersect; and/or optical waveguides included in the optical signal paths connecting the at least x input/output interface pairs in the second waveguide layer do not intersect.

Optionally, the method further includes: adjusting a refractive index of a preset area in the second waveguide layer based on the control information, to form or eliminate an optical waveguide in the second waveguide layer.

Optionally, step 102 further includes: controlling the first waveguide layer based on the control information, to form, in the waveguide structure, the optical signal paths connecting the at least x input/output interface pairs. Each optical waveguide included in the optical signal paths connecting the at least x input/output interface pairs in the second waveguide layer corresponds to one input/output interface pair, and any optical waveguide included in the optical signal paths connecting the at least x input/output interface pairs in the second waveguide layer and an optical waveguide in the first waveguide layer are configured to form an optical signal path connecting an input/output interface pair corresponding to the any optical waveguide.

In conclusion, in the control method for the optical waveguide apparatus provided in this embodiment of this application, the control component can control the first waveguide layer to form an optical waveguide, and the optical waveguide and an optical waveguide in the second waveguide layer form a cross-layer optical signal path. In this way, another optical waveguide in the first waveguide layer can pass through the optical signal path by using a cross-layer position in the optical signal path. Intersections of optical waveguides in a same waveguide layer are reduced, and a loss caused by co-layer intersections is reduced, further reducing an overall loss of the optical waveguide apparatus.

An embodiment of this application further provides a computer-readable storage medium. The computer-readable storage medium stores an instruction. When the computer-readable instruction is run on an authentication apparatus, the authentication apparatus is enabled to perform the control method for the optical waveguide apparatus provided in the foregoing embodiment. For example, the control method for the optical waveguide apparatus may include:

obtaining control information, where the control information is used to instruct to connect at least x input/output interface pairs; and controlling a first waveguide layer, to form, in a waveguide structure, optical signal paths connecting the at least x input/output interface pairs.

An optical signal path connecting each of the at least x input/output interface pairs includes at least one optical waveguide in the first waveguide layer or a second waveguide layer, and each of the at least x input/output interface pairs includes one of m input interfaces and one of n output interfaces, where x is an integer greater than or equal to 1.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. An optical waveguide apparatus, wherein the optical waveguide apparatus comprises:

a control component and a waveguide structure, wherein the waveguide structure comprises m input interfaces and n output interfaces, and both m and n are integers greater than or equal to 1;

the waveguide structure comprises a first waveguide layer, wherein the first waveguide layer is configured to form or eliminate an optical waveguide under control of the control component;

the waveguide structure further comprises a second waveguide layer, wherein an optical waveguide exists in the second waveguide layer; and the control component is configured to control the first waveguide layer based on control information, to form, in the waveguide structure, optical signal paths connecting at least x input/output interface pairs, an optical signal path connecting each of the at least x input/output interface pairs comprises at least one optical waveguide in the first waveguide layer or the second waveguide layer, and each of the at least x input/output interface pairs comprises one of the m input interfaces and one of the n output interfaces, wherein x is an integer greater than 1, and the control information is used to instruct to connect the at least x input/output interface pairs, and wherein optical waveguides comprised in the optical signal paths connecting the at least x input/output interface pairs in the first waveguide layer do not intersect;

the control component is configured to adjust a refractive index of a preset area in the first waveguide layer based on the control information, to form or eliminate an optical waveguide in the first waveguide layer; and the second waveguide layer is a fixed waveguide layer, and a plurality of fixed optical waveguides are disposed in the fixed waveguide layer; and wherein a cross-layer optical signal path that comprises at least one optical waveguide in the first waveguide layer and at least one optical waveguide in the second waveguide layer exists in the optical signal paths connecting the at least x input/output interface pairs;

the waveguide structure is configured to allow an optical signal to enter the second waveguide layer from the first waveguide layer or enter the first waveguide layer from the second waveguide layer through a coupling position between two adjacent optical waveguides in different waveguide layers in the cross-layer optical signal path; and a minimum distance between the two optical waveguides at the coupling position is less than an intersecting waveguide distance, wherein the intersecting waveguide distance is a minimum distance between either of the two optical waveguides and an intersecting optical waveguide, and the intersecting optical waveguide is an optical waveguide that is in a different waveguide layer and that intersects with the either optical waveguide.

2. The optical waveguide apparatus according to claim 1, wherein
optical waveguides comprised in the optical signal paths connecting the at least x input/output interface pairs in the second waveguide layer do not intersect.

3. The optical waveguide apparatus according to claim 1, wherein
each optical waveguide comprised in the optical signal paths connecting the at least x input/output interface pairs in the second waveguide layer corresponds to one of the input/output interface pairs, and any optical waveguide comprised in the optical signal paths connecting the at least x input/output interface pairs in the second waveguide layer and an optical waveguide in the first waveguide layer are configured to form an optical signal path connecting an input/output interface pair corresponding to the any optical waveguide.

4. The optical waveguide apparatus according to claim 1, wherein the first waveguide layer and the second waveguide layer are attached to each other;
a bump facing the first waveguide layer is disposed on the second waveguide layer at an intersection of the either optical waveguide and the intersecting optical waveguide; or
a dent having an opening facing the first waveguide layer is disposed in the second waveguide layer at the coupling position, and a part, at the coupling position, of the optical waveguide in the first waveguide layer in the two optical waveguides is located in the dent.

5. The optical waveguide apparatus according to claim 1, wherein a support structure layer is disposed between the first waveguide layer and the second waveguide layer, and the first waveguide layer and the second waveguide layer are respectively attached to two sides of the support structure layer;
dents having openings facing at least one of the first waveguide layer and the second waveguide layer are disposed on the two sides of the support structure layer at the coupling position; or
bumps facing at least one of the first waveguide layer and the second waveguide layer are disposed on the two sides of the support structure layer and at the intersection of the either optical waveguide and the intersecting optical waveguide.

6. The optical waveguide apparatus according to claim 1, wherein
the first waveguide layer is made of an electro-optical material; and
the control component comprises a controller and an electric field structure, wherein the controller is configured to change the refractive index of the preset area in the first waveguide layer by controlling an electric field applied by the electric field structure to the first waveguide layer, to form or eliminate an optical waveguide in the first waveguide layer.

7. A control method for an optical waveguide apparatus, wherein the method is applied to a control component in an optical waveguide apparatus, the optical waveguide apparatus further comprises a waveguide structure, the waveguide structure comprises m input interfaces and n output interfaces, wherein both m and n are integers greater than or equal to 1, the waveguide structure comprises a first waveguide layer and a second waveguide layer, an optical waveguide exists in the second waveguide layer, the first waveguide layer is configured to form or eliminate an optical waveguide under control of the control component, and the method comprises:
obtaining control information, wherein the control information is used to instruct to connect at least x input/output interface pairs;
controlling the first waveguide layer, to form, in the waveguide structure, optical signal paths connecting the at least x input/output interface pairs; and
an optical signal path connecting each of the at least x input/output interface pairs comprises at least one optical waveguide in the first waveguide layer or the second waveguide layer, and each of the at least x input/output interface pairs comprises one of the m input interfaces and one of the n output interfaces, wherein x is an integer greater than 1, and wherein
optical waveguides comprised in the optical signal paths connecting the at least x input/output interface pairs in the first waveguide layer do not intersect;
the control component is configured to adjust a refractive index of a preset area in the first waveguide layer based on the control information, to form or eliminate an optical waveguide in the first waveguide layer; and
the second waveguide layer is a fixed waveguide layer, and a plurality of fixed optical waveguides are disposed in the fixed waveguide layer, and wherein
a cross-layer optical signal path that comprises at least one optical waveguide in the first waveguide layer and at least one optical waveguide in the second waveguide layer exists in the optical signal paths connecting the at least x input/output interface pairs;
the waveguide structure is configured to allow an optical signal to enter the second waveguide layer from the first waveguide layer or enter the first waveguide layer from the second waveguide layer through a coupling position between two adjacent optical waveguides in different waveguide layers in the cross-layer optical signal path; and
a minimum distance between the two optical waveguides at the coupling position is less than an intersecting waveguide distance, wherein the intersecting waveguide distance is a minimum distance between either of the two optical waveguides and an intersecting optical waveguide, and the intersecting optical waveguide is an optical waveguide that is in a different waveguide layer and that intersects with the either optical waveguide.

8. The method according to claim 7, wherein optical waveguides comprised in the optical signal paths connecting the at least x input/output interface pairs in the second waveguide layer do not intersect.

* * * * *